United States Patent
Agnihotri et al.

(10) Patent No.: US 6,608,930 B1
(45) Date of Patent: Aug. 19, 2003

(54) METHOD AND SYSTEM FOR ANALYZING VIDEO CONTENT USING DETECTED TEXT IN VIDEO FRAMES

(75) Inventors: Lalitha Agnihotri, Fishkill, NY (US); Nevenka Dimitrova, Yorktown Heights, NY (US); Jan H. Elenbaas, New York, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/370,931

(22) Filed: Aug. 9, 1999

(51) Int. Cl.$^7$ .................................................. G06K 9/34
(52) U.S. Cl. ........................ 382/176; 382/173; 382/190
(58) Field of Search ................................. 382/176, 190, 382/173, 177, 178, 179, 198, 209; 348/465, 722; 709/217; 704/8

(56) References Cited

U.S. PATENT DOCUMENTS

| | | | | |
|---|---|---|---|---|
| 4,965,763 A | * | 10/1990 | Zamora | 364/900 |
| 5,091,964 A | * | 2/1992 | Shimomura | 382/173 |
| 5,774,579 A | * | 6/1998 | Wang et al. | 382/176 |
| 6,192,151 B1 | * | 2/2001 | Miyatake et al. | 382/190 |

FOREIGN PATENT DOCUMENTS

EP 0720114 A2 7/1996

OTHER PUBLICATIONS

"Conivas: Content-based Image and Video Access System", by Mohamed Abdel-Mottaleb et al., Proceedings of ACM Multimedia, 1996, pp. 427-428.

"VideoQ: An Automated Content Based Video Search System using Visual Cues", by Shih-Fu Chang et al., Proceedings of ACM Multimedia, 1994, pp. 313-324.

"Information Digital Video Library", by M. Christel et al., vol. 38, No. 4, 1995, pp. 57-58.

"Video Content Management in Consumer Devices", by Nevenka Dimitrova et al., IEEE Transactions on Knowledge and Data Engineering, vol. 10, No. 6, Nov. 1998, pp. 988-995.

"Indexing Text Events in Digital Video Databases", by U. Gargi et al., International Conference on Pattern Recognition, Aug. 1998, pp. 916-918.

"Image Indexing Using Moments and Wavelets", by M.K. Mandal et al., IEEE Transactions on Consumer Electronics, vol. 42, No. 3, Aug. 1996, pp. 557-565.

(List continued on next page.)

Primary Examiner—Anh Hong Do
(74) Attorney, Agent, or Firm—Edward W. Goodman

(57) ABSTRACT

There is disclosed, for use in video text analysis system, a video processing device for searching video streams for one or more user-selected image text attributes. The video processing device comprises an image processor capable detecting and extracting image text from video frames, determining attributes of the extracted image text, comparing the extracted image text attributes and the user-selected image text attributes, and, if a match occurs, modifying, transferring, and/or labeling at least a portion of the video stream in accordance with user commands. The invention uses the user-selected image text attributes to search through an archive of video clips to 1) locate particular types of events, such as news programs or sports events; 2) locate programs featuring particular persons or groups; 3) locate programs by name; 4) save or remove all or some commercials, and to otherwise sort, edit, and save all of, or portions of, video clips according to image text that appears in the frames of the video clips.

24 Claims, 5 Drawing Sheets

OTHER PUBLICATIONS

"Abstracting Digital Moves Automatically", S. Pfeiffer et al., Journal on Visual Communications and Image Representation, vol. 7, No. 4, 1996, pp. 345–353.

"On the Detection and Recognition of Television Commercials", by R. Lienhart et al., Proceedings of IEEE International Conference on Multimedia Computing and Systems, 1996, pp. 509–516.

"Parsing TV Programs for Identification and Removal of Non–Story Segments", T. McGee et al., SPIE Conference on Storage and Retrieval in Image and Video Databases, 1999, pp. 243–251.

"Recognizing Characters in Scene Images", by Ohya et al., IEEE Transactions on Pattern Analysis and Machine Intelligence, vol. 16, 1994, pp. 214–224.

"Text, Speech, and Vision for Video Segmentation: The Informedia Project", by A . Hauptmann et al., AAAI Fall 1995, Symposium on Computational Models for Integrating Language and Vision.

"Automatic Text Recognition in Digital Videos", by R. Lienhart et al, SPIE Conference on Image and Video Processing, SPIE vol. 2666, pp. 180–188.

"Automatic Text Location in Images and Video Frames" by A.K. Jain et al, Proceedings of IEEE Pattern Recognition, vol. 31, 1998, pp. 2055–2076.

"Automatic Text Extraction from Video for Content–Based Annotation and Retrieval", by J.C. Shim et al, Proceedings of the International Conference on Pattern Recognition, pp. 618–620, 1998.

"A Spatial Thresholding Method for Image Segmentation", by K.V. Mardia et al., IEEE Transactions on Pattern Analysis and Machine Intelligence, vol. 10, 1988, pp. 919–927.

An Iterative Thresholding Algorithm for Image Segmentation, by A. Perez et al., IEEE Transactions on Pattern Analysis and Machine Intelligence, vol. 9, 1987, pp. 742–751.

"Digital Image Processing" by R.C. Gonzalez et al., Addison–Wesley Publishing Co. 1992, pp. 191–192.

"Visual Content Highlighting via Automatic Extraction of Embedded Captions on MPEG Compressed Video" by Boon–lock Yeo and Bede Liu, in Digital Video Compression: Algorithms and Technologies 1996, San Jose, CA, USA, 31 Jan. 2–Feb. 1996, vol. 2668, pp 38–47, Proceedings of the SPIE, The International Society for Optical Engineering, 1996.

* cited by examiner

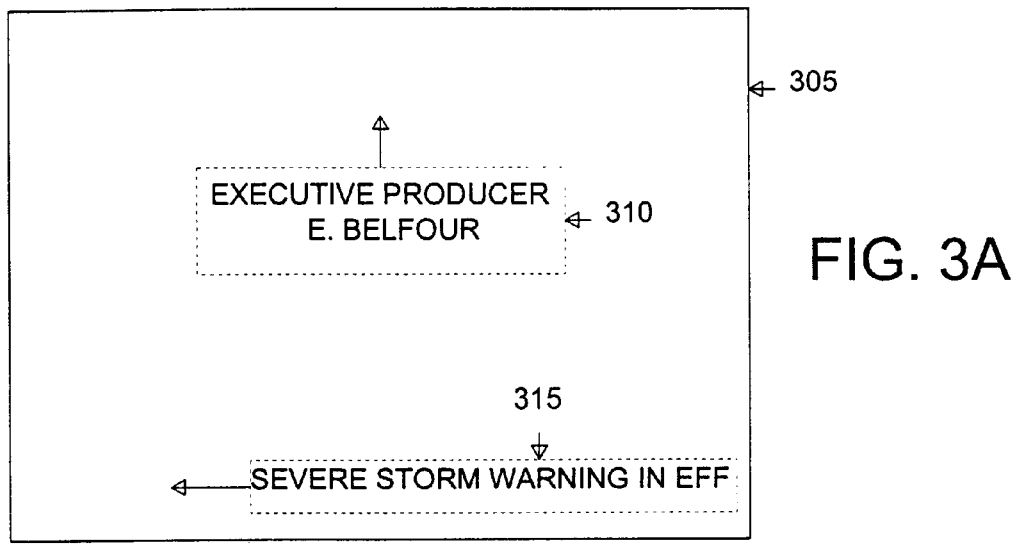
FIG. 3A
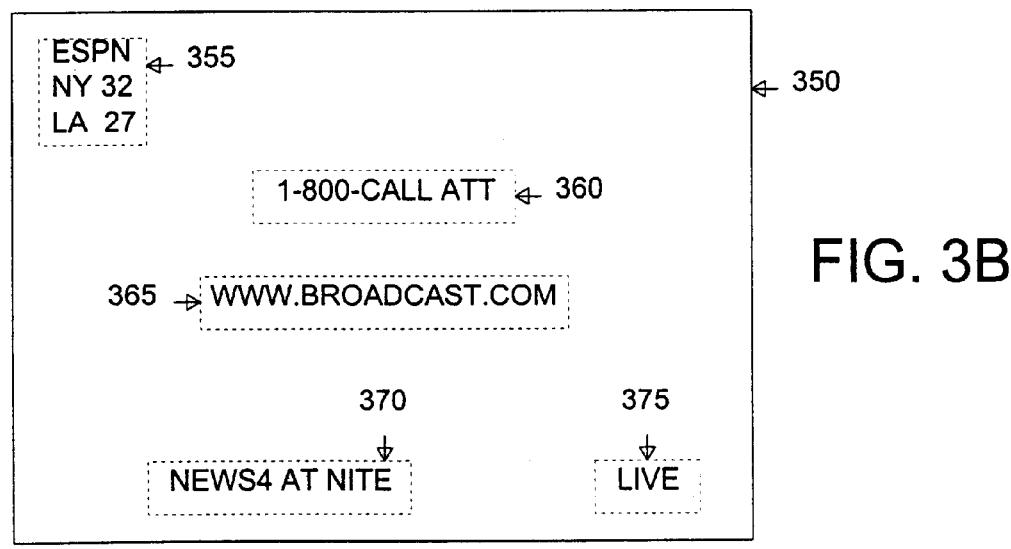
FIG. 3B
FIGURE 3

METHOD AND SYSTEM FOR ANALYZING VIDEO CONTENT USING DETECTED TEXT IN VIDEO FRAMES

CROSS-REFERENCE TO RELATED APPLICATIONS

The present invention is related to that disclosed in U.S. Provisional Patent Application No. 60/117,658, filed on Jan. 28, 1999, entitled "METHOD AND APPARATUS FOR DETECTION AND LOCALIZATION OF TEXT IN VIDEO," which is commonly assigned to the assignee of the present invention. The disclosure of this related provisional patent application is incorporated herein by reference for all purposes as if fully set forth herein.

TECHNICAL FIELD OF THE INVENTION

The present invention is directed, in general, to video processing systems and, more specifically, to a system for analyzing and characterizing a video stream based on the attributes of text detected in the content of the video.

BACKGROUND OF THE INVENTION

The advent of digital television (DTV), the increasing popularity of the Internet, and the introduction of consumer multimedia electronics, such as compact disc (CD) and digital video disc. (DVD) players, have made tremendous amounts of multimedia information available to consumers. As video content becomes readily available and products for accessing it reach the consumer market, searching, indexing and identifying large volumes of multimedia data becomes even more challenging and important.

Systems and methods for indexing and classifying video have been described in numerous publications, including: M. Abdel-Mottaleb et al., "CONIVAS: Content-based Image and Video Access System," Proceedings of ACM Multimedia, pp. 427–428, Boston (1996); S-F. Chang et al., "VideoQ: An Automated Content Based Video Search System Using Visual Cues," Proceedings of ACM Multimedia, pp. 313–324, Seattle (1994); M. Christel et al., "Informedia Digital Video Library," Comm. of the ACM, Vol. 38, No. 4, pp. 57–58 (1995); N. Dimitrova et al., "Video Content Management in Consumer Devices," IEEE Transactions on Knowledge and Data Engineering (Nov. 1998); U. Gargi et al., "Indexing Text Events in Digital Video Databases," International Conference on Pattern Recognition, Brisbane, pp. 916–918 (Aug. 1998); M. K. Mandal et al., "Image Indexing Using Moments and Wavelets," IEEE Transactions on Consumer Electronics, Vol. 42, No. 3 (Aug. 1996); and S. Pfeiffer et al., "Abstracting Digital Moves Automatically," Journal on Visual Communications and Image Representation, Vol. 7, No. 4, pp. 345–353 (1996).

The detection of advertising commercials in a video stream is an also active research area. See R. Lienhart et al., "On the Detection and Recognition of Television Commercials," Proceedings of IEEE International Conference on Multimedia Computing and Systems, pp. 509–516 (1997); and T. McGee et al., "Parsing TV Programs for Identification and Removal of Non-Story Segments," SPIE Conference on Storage and Retrieval in Image and Video Databases, San Jose (Jan. 1999).

Recognition of text in document images is well known in the art. Document scanners and associated optical character recognition (OCR) software are widely available and well understood. However, detection and recognition of text in video frames presents unique problems and requires a very different approach than does text in printed documents. Text in printed documents is usually restricted to single-color characters on a uniform background (plain paper) and generally requires only a simple thresholding algorithm to separate the text from the background. By contrast, characters in scaled-down video images suffer from a variety of noise components, including uncontrolled illumination conditions. Also, the background frequently moves and text characters may be of different color, sizes and fonts.

The extraction of characters by local thresholding and the detection of image regions containing characters by evaluating gray-level differences between adjacent regions has been described in "Recognizing Characters in Scene Images," Ohya et al., IEEE Transactions on Pattern Analysis and Machine Intelligence, Vol. 16, pp. 214–224 (Feb. 1994). Ohya et al. further discloses the merging of detected regions having close proximity and similar gray levels in order to generate character pattern candidates.

Using the spatial context and high contrast characteristics of video text to merge regions with horizontal and vertical edges in close proximity to one another in order to detect text has been described in "Text, Speech, and Vision for Video Segmentation: The Informedia Project," by A. Hauptmann et al., AAAI Fall 1995 Symposium on Computational Models for Integrating Language and Vision (1995). R. Lienhart and F. Suber discuss a non-linear red, green, and blue (RGB) color system for reducing the number of colors in a video image in "Automatic Text Recognition for Video Indexing," SPIE Conference on Image and Video Processing (Jan. 1996). A subsequent split-and-merge process produces homogeneous segments having similar color. Lienhart and Suber use various heuristic methods to detect characters in homogenous regions, including foreground. characters, monochrome or rigid characters, size-restricted characters, and characters having high contrast in comparison to surrounding regions.

Using multi-valued image decomposition for locating text and separating images into multiple real foreground and background images is described in "Automatic Text Location in Images and Video Frames," by A. K. Jain and B. Yu, Proceedings of IEEE Pattern Recognition, pp. 2055–2076, Vol. 31 (Nov. 12, 1998). J-C. Shim et al. describe using a generalized region-labeling algorithm to find homogeneous regions and to segment and extract text in "Automatic Text Extraction from Video for Content-Based Annotation and Retrieval," Proceedings of the International Conference on Pattern Recognition, pp. 618–620 (1998). Identified foreground images are clustered in order to determine the color and location of text.

Other useful algorithms for character segmentation are described by K. V. Mardia et al. in "A Spatial Thresholding Method for Image Segmentation," IEEE Transactions on Pattern Analysis and Machine Intelligence, Vol. 10, pp. 919–927 (1988), and by A. Perez et al. in "An Iterative Thresholding Method for Image Segmentation," IEEE Transactions on Pattern Analysis and Machine Intelligence, Vol. 9, pp. 742–751 (1987).

The prior art text-recognition systems do not take into account, however, the non-semantic attributes of text detected in the content of the video. The prior art systems simply identify the semantic content of the image text and index the video clips based on the semantic content. Other attributes of the image text, such as physical location in the frame, duration, movement, and/or temporal location in a program are ignored. Additionally, no attempt has been made to use video content to identify and edit video clips.

There is therefore a need in the art for improved video processing systems that enable a user to search through an archive of video clips and to selectively save and/or edit all or portions of video clips that contain image text attributes that match image text attributes selected by a user.

SUMMARY OF THE INVENTION

To address the above-discussed deficiencies of the prior art, the present invention discloses a video processing device for searching or filtering video streams for one or more user-selected image text attributes. Generally, "searching" video streams refers to searching in response to user-defined inputs, whereas "filtering" generally refers to an automated process that requires little or no user input. However, in the disclosure, "searching" and "filtering" may be used interchangeably. An image processor detects and extracts image text from frames in video clips, determines the relevant attributes of the extracted image text, and compares the extracted image text attributes and the user-selected image text attributes. If a match occurs, the video processing device may modify, transfer, label or otherwise identify at least a portion of the video stream in accordance with user commands. The video processing device uses the user-selected image text attributes to search through an archive of video clips to 1) locate particular types of events, such as news programs or sports events; 2) locate programs featuring particular persons or groups; 3) locate programs by name; 4) save or remove all or some commercials, and to otherwise sort, edit, and save all of, or portions of, video clips according to image text that appears in the frames of the video clips.

It is a primary object of the present invention to provide, for use in a system capable of analyzing image text in video frames, a video processing device capable of searching and/or filtering video streams in response to receipt of at least one selected image text attribute. In an exemplary embodiment, the video processing device comprises an image processor capable of receiving a first video stream comprising a plurality of video frames, detecting and extracting image text from the plurality of video frames, determining at least one attribute of the extracted image text, comparing the at least one extracted image text attribute and the at least one selected image text attribute, and, in response to a match between the at least one extracted image text attribute and the at least one selected image text attribute, at least one of: 1) modifying at least a portion of the first video stream in accordance with a first user command; 2) transferring at least a portion of the first video stream in accordance with a second user command; and 3) labeling at least a portion of the first video stream in accordance with a third user command.

According to an exemplary embodiment of the present invention, the at least one extracted image text attribute indicates that the image text in the plurality of video frames is one of: scrolling horizontally; scrolling vertically; fading, special effects and animation effects.

According to one embodiment of the present invention, the at least one extracted image text attribute indicates that the image text in the plurality of video frames is one of: a name of a person; and a name of a group.

According to another embodiment of the present invention, the at least one extracted image text attribute indicates that the image text in the plurality of video frames is part of a commercial advertisement.

According to still another embodiment of the present invention, the at least one extracted image text attribute indicates that the image text in the plurality of video frames is text appearing at one of: a start of a program; and an end of a program.

According to yet another embodiment of the present invention, the at least one extracted image text attribute indicates that the image text in the plurality of video frames is part of a program name.

According to a further embodiment of the present invention, the at least one extracted image text attribute indicates that the image text in the plurality of video frames is part of a news program.

According to a still further embodiment of the present invention, the at least one extracted image text attribute indicates that the image text in the plurality of video frames is part of a sports program.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "processor" or "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Additionally, the term "video clip" may mean a video segment, a video sequence, video content, or the like. Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIGS. 3A and 3B illustrate video frames containing image text having selected attributes identifiable by the video processing device in FIG. 1;

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged image text analysis system.

Figure 1:
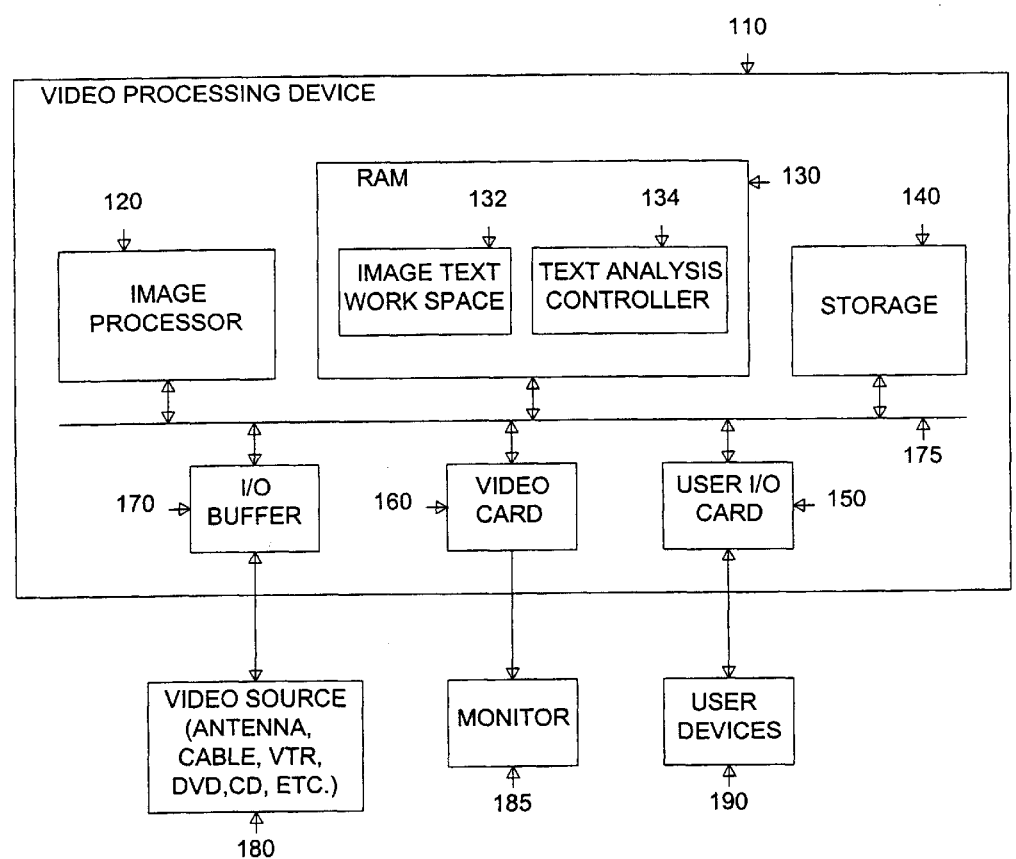
FIG. 1 illustrates an exemplary image text analysis system in accordance with one embodiment of the present invention.

FIG. 1 illustrates exemplary image text analysis system 100 in accordance with one embodiment of the present invention. Image text analysis system 100 comprises video processing device 110, video source 180, monitor 185, and user devices 190. Video processing device 110 provides means for analyzing received video images. This includes accomplishing the process of the present invention by which video text is extracted, analyzed, and categorized on the basis of system- or user-defined text attributes.

Video source 180 provides an archive of video clips for searching by video processing device 110. Video source 180 may be one or more of an antenna, a video tape recorder (VTR), a digital video disc (DVD) player/recorder, a video disc player/recorder, or a similar device capable of storing and transferring digitized video images, with or without audio. Video source 180 may be capable of providing a few short clips or multiple clips, including longer length digitized video images. Video source 180 may provide video data in any known analog or digital format, such as MPEG-2, MJPEG, and the like.

Monitor 185 provides means for displaying video images and may be equipped for audio, as required. User device(s) 190 represents one or more peripheral devices that may be manipulated by the user of image text analysis system 100 to provide user inputs to the system. Typical peripheral user input devices include a computer mouse, a keyboard, a lightpen, a joystick, a touch-table and associated stylus, and/or any other device that may selectively be used to enter, to select, and/or to manipulate data, including all or portions of the displayed video image(s). User device(s) 190 may be capable of selecting the desired video text identification attributes for input to video processing device 110. User device(s) 190 may also include output devices, such as a color printer, that reproduce a hard copy of a particular image, frame, or clip.

Video processing device 110 comprises image processor 120, RAM 130, storage 140, user I/O card 150, video card 160, I/O buffer 170, and processor bus 175. Processor bus 175 transfers data between the various elements of video processing device 110. RAM 130 further comprises image text work space 132 and text analysis controller 134.

Image processor 120 provides over-all control for video processing device 110 and performs the image processing required for image text analysis system 100, including analyzing text in video frames based upon system-selected and user-selected attributes. This also includes implementing editing processes, processing digitized video images for display on monitor 185 and/or storage in storage 140, and transferring data between the various elements of image text analysis system 100. The requirements and capabilities for image processor 120 are well known in the art and need not be described in greater detail, other than as required for the present invention.

RAM 130 provides random access memory for temporary-storage of data produced by video processing device 110, which is not otherwise provided by components within the system. RAM 130 includes memory for image text work space 132 and text analysis controller 134, as well as other memory required by image processor 120 and associated devices. Image text work space 132 represents the portion of RAM 130 in which video images associated with a particular video clip are temporarily stored during the text analysis process. Image text work space 132 provides means for modifying frames within a clip without affecting the original data, so that the original data may later be recovered.

In one embodiment of the present invention, text analysis controller 134 represents the portion of RAM 130 dedicated to storage of an application program executed by image processor 120 that performs the analysis of video images on the basis of system- or user-defined text attributes. Text analysis controller 134 may execute well-known editing techniques, such as morphing or boundary detection between scenes, as well as the novel techniques for video text analysis associated with the present invention. Editing controller 134 may also be embodied as a program on a CD-ROM, computer diskette, or other storage media that may be loaded into a removable disk port in storage 140 or elsewhere, such as in video source 180.

Storage 140 comprises one or more disk systems, including removable disks (magnetic or optical), for permanent storage of programs and other data, including required video and audio data. Depending upon system requirements, storage 140 is configured to interface with one or more bidirectional buses for the transfer of video and audio data to and from video source(s) 180, as well as the rest of the system. Storage 140 is capable of transferring data at video rates, as required. Storage 140 is sized to provide adequate storage for several minutes of video for editing purposes, including text attribute analysis. Depending upon specific applications and the capability of image processor 120, storage 140 may be configured to provide capability for storage of a large number of video clips.

User I/O card 150 provides means for interfacing user device(s) 190 to the rest of image text analysis system 100. User I/O card 150 converts data received from user devices 190 to the format of interface bus 175 for transfer to image processor 120 or to RAM 130 for subsequent access by image processor 120. User I/O card 150 also transfers data to user output devices such as printers. Video card 160 provides an interface between monitor 185 and the rest of video processing device 110 through data bus 175.

I/O buffer 170 provides an interface between video source 180 and the rest of image text analysis system 100 through bus 175. As previously discussed, video source 180 has at least one bidirectional bus for interfacing with I/O buffer 170. I/O buffer 170 transfers data to/from video source 180 at the required video image transfer rate. Within video processing device 110, I/O buffer 170 transfers data received from video source 180 to storage 140, to image processor 120, or to RAM 130, as required. Simultaneous transfer of video data to image processor 120 provides means for displaying video image as they are received.

Figure 2:
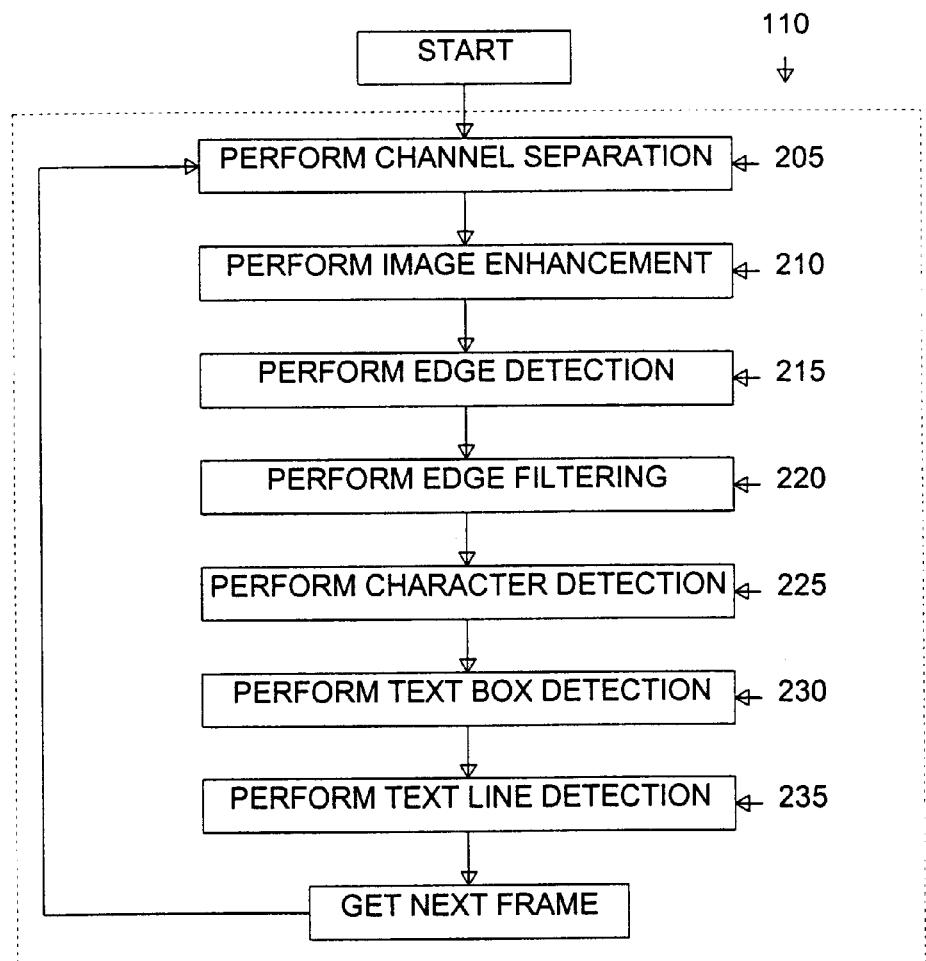
FIG. 2 is a flow diagram illustrating a text extraction and recognition operation of exemplary video processing device in FIG. 1 according to one embodiment of the invention.

FIG. 2 depicts flow diagram 200, which illustrates the text extraction and recognition operation of video processing device 110, in accordance with one embodiment of the present invention. Text extraction is performed on individual video frames, with the origin (0,0) of the MxN frame identified as the top left corner. Pixels within the frame are referenced by (x,y) coordinates, where x is the pixel column (0 through N) and y is the pixel row (0 through M).

Channel Separation (process step 205):

Initially, image processor 120 separates colors of one or more frames of the video image and stores a reduced color image for use in extracting text. In one embodiment of the present invention, image processor 120 uses a red-green-blue (RGB) color space model to isolate the red component of the pixels. The red component is more useful for detecting white, yellow, and black colors, which are predominantly used for video text. The isolated red frame provides sharp, high-contrast edges for these frequent text colors. The isolated red frame image is stored in image text work space 132.

Image Enhancement (process step 210):

Before further processing is performed, the captured red frame is enhanced using a 3×3 mask, as follows:

$$\begin{matrix} -1 & -1 & -1 \\ -1 & 8 & -1 \\ -1 & -1 & -1 \end{matrix}$$

In addition, salt and pepper (random) noise is removed using a median filter, such as the one described by R. C. Gonzalez and R. E. Woods in "Digital Image Processing," Addison-Wesley Publishing Company, Inc. (1992).

Edge detection (process step 215):

Text character edges in the enhanced red image are detected by using the following mask:

$$\begin{matrix} -1 & -1 & -1 \\ -1 & 12 & -1 \\ -1 & -1 & -1 \end{matrix}$$

where the numbers in the matrix represent the weights of the edge operator.

If EDGE represents the MxN edge image, the following equation may be used for edge detection:

$$EDGE_{m,n} = \sum_{i=-1}^{1} \sum_{j=-1}^{1} w_{i,j} F_{m+i,n+j} < EdgeThreshold$$

where 0<m<M and 0<n<N. The values $w_{ij}$ are the weights from the edge mask and $F_{m+i, n+j}$ represents a pixel of the image "F". The top and bottom pixel rows and the left and right pixel columns (i.e., the outermost pixels) of the frame are ignored in the edge detection process.

Edge Threshold is a pre-determined threshold value and may be fixed or variable. The use of a fixed threshold may result in a lot of salt and pepper noise, which subsequently needs to be deleted. Also, the use of a fixed threshold may cause the fixed edges around the text to appear broken and disconnected., resulting in the appearance of a split character. Using known methods of opening (e.g., erosion followed by dilation) results in losing parts of text along with salt and pepper noise. Therefore, using an adaptive threshold is an improvement over using a static threshold.

If, for a pixel, some or all neighboring pixels are marked as edges, the threshold is lowered for the current pixel in order to mark it as an edge. The threshold for the current pixel can be lowered depending on the number of neighboring pixels marked as edges. The fact that neighboring pixels are edges increases the probability that the current pixel is an edge. The lower edge threshold is used for calculating the reduced threshold for neighboring pixels. This ensures that pixels are not marked as edges when they are not edges. The process could be performed in reverse to mark a pixel as an edge if it is surrounded by edge pixels.

Edge Filtering (Process step 220):

Once the character edges are detected, image processor 120 performs preliminary edge filtering to remove image regions which may not contain text or in which text cannot reliably be detected. Image processor 120 may perform edge filtering at different levels. For instance, edge filtering may be performed at a frame level and sub-frame level.

At the frame level, image processor 120 ignores or filters out a frame if more than a reasonable portion of the frame appears to be composed of edges, which might be due to a high density of objects in the frame. Once a frame is filtered out, text analysis proceeds to the next input frame. When frame level of filtering is used, image processor 120 maintains an edge counter in order to keep a count of the number of edges in the image frame. This, however, can lead to the loss of text in some clean areas of the image and may result in false negatives.

In order to overcome this problem, image processor 120 may perform edge filtering at a sub-frame level. To find text in an "over crowded" frame, image processor 120 divides the frame into smaller areas or sub-frames. In an exemplary embodiment of the present invention, image processor 120 divides the sum-frame into three groups of pixel columns and three groups of pixel rows, resulting in a quantity of six sub-frames.

Image processor 120 assigns a sub-frame counter to maintain an edge count for each sub-divided portion of the image, resulting in six sub-frame counters. In the exemplary embodiment, three counters are used for three vertical (column) sub-frames of the image. Each vertical sub-frame covers one third of the area of the frame). Similarly, three counters are used for three horizontal (row) sub-frames of the image. Again, each horizontal sub-frame covers one third of the frame area.

Next, image processor 120 examines each sub-frame area to determine the number of edges in the sub-frame, with its associated counter reflecting this number. A greater number of sub-frames may be utilized to create smaller sub-frame areas, in order to retain more areas that are clean and to contain text in a region smaller than one-third of an image.

Character Detection (Process step 225):

Next, image processor 120 performs a Connected-Component (CC) analysis on edges generated in the previous step. Each text character is assumed to have a connected component or a part thereof. Image processor 120 merges edge pixels that are within a certain distance of each other (such as an eight-pixel neighborhood) into a single Connected-Component structure. This Connected-Component structure contains the location of the pixels that are connected together. This structure also contains the value (in terms of the x- and y-axes) of the leftmost, rightmost, top, and bottom pixels in the structure, along with the location of the center of the structure.

The connected component structure also contains the count of the number of pixels that form the Connected- Component. The pixel count represents the area of the particular Connected-Component. Predetermined system and/or user thresholds define the maximum and minimum limits for area, height and width of the Connected-Component in order to determine which Connected-Components are to be passed on to the next processing stage. Connected-Components that are outside of the threshold criteria are filtered out.

Text Box Detection (process step 230):

Image processor 120 sorts the Connected-Components that pass the criteria in the previous step in ascending order based on the location of the bottom left pixel. Image processor 120 sorts on the basis of the (x,y) coordinate location, which represents the absolute location of a pixel, given as y times the column size plus x. The sorted list of Connected-Components is traversed and the Connected-Components are then merged together to form boxes of text.

Image processor 120 assigns the first connected component, Connected-Component(1), as the first box and also as the initial or current box for analysis. Image processor 120 tests each subsequent Connected-Component(i) to see if its bottommost pixel lies within a predefined acceptable pixel row threshold from the bottommost pixel of the current text box. If Connected-Component(i) lies within a few rows (for example, 2 rows) of the current box, there is a good chance that the current text box and Connected-Component(i) belong to the same line of text. The row difference threshold may be fixed or variable, as required. For instance, the threshold may be a fraction of the height of the current text box.

In order to avoid merging Connected-Components that are separated by too much distance in the image, a second test is performed to see if the column distance between Connected-Component(i) and the text boxes is less than a column threshold. This variable threshold is a multiple of the width of Connected-Component(i). Image processor 120 merges Connected-Component(i) with the current text box if the text box and Connected-Component(i) are in close proximity. If Connected-Component(i) does not meet the criteria for merging with the current text box, a new text box is started with Connected Component(i) as its first component and the traversing is continued. This process may result in multiple text boxes for a single line of text in the image.

Image processor 120 performs a second level of merging for each of the text boxes created by the initial character merging process. This merges text boxes that might have been mistakenly interpreted as separate lines of text, either due to strict Connected-Component merging criteria or due to poor edge detection, thereby resulting in multiple Connected-Components for the same character.

Image processor 120 compares each box to the text boxes following it for a set of conditions. The multiple test conditions for two text boxes are:

a) The bottom of one box is within the row difference threshold of the other. Also, the horizontal direction distance between the two boxes is less than a variable threshold based on the average width of characters in the first box.

b) The center of either of the boxes lies within the area of the other text box, or c) the text boxes overlap.

If any of the above conditions is satisfied, image processor 120 deletes the second box from the list of text boxes and merges it into the first box. Image processor 120 repeats the process until all text boxes are tested against each other and combined as far as possible.

Text Line Detection and Enhancement (process step 235):

Image processor 120 accepts the text boxes obtained from step 235 as text lines if they conform to the constraints of area, width and height. For each of the text boxes, image processor 120 extracts the sub-image corresponding to the text box from the original image. Image processor 120 then modifies the extracted sub-image so that the text appears in foreground as black with a white background. This modification is required so that the output of this stage can be processed by an optical character recognition (OCR) application program.

Image processor 120 modifies the text box image by calculating the average grayscale value of the pixels in the text box (AvgFG). The average grayscale value of a region (for example, 5 pixels) around the text box is also calculated (AvgBG). Within the text box, image processor 120 marks anything above AvgFG as white and marks anything below AvgFG as black. The average for the pixels marked as white, Avg1, is calculated along with the average for the pixels marked as black, Avg2.

Once the text box is converted to a black and white (binary) image, image processor 120 compares Avg1 and Avg2 to AvgBG. The region that has an average closer to AvgBG is assigned as the background and the other region is assigned as the foreground (or text) For example, if the black region average is closer to AvgBG, the black region is converted to white and vice versa.

This assures that the text is always in black and is consistent for input to an OCR program.

Image processor 120 subsequently stores the extracted frame text in image text work space 132 and the process continues with the next frame at process step 205. The sequence continues until text has been extracted from all frames of the selected video clip. Once video image text has been recognized and extracted, image processor 120 may further isolate and analyze the extracted text based upon system-selected or user-selected text attributes. Video sequences or clips may be searched or indexed based upon the text present in a frame or a group of frames. For example, the presence of the word "hotel" in a frame may indicate a high probability of a hotel scene in the present and following frames. The presence of street names and numbers indicates the possibility of city scenes. Identification of billboard text can be helpful when searching for frames with highway scenes.

It is also possible to use text for analyzing and labeling specific video frames. For example, image processor 120 may identify and extract live news reports that were broadcast as part of a particular news program or were given by a particular news reporter. Image processor 120 may do this by searching for keywords in image text, including "LIVE", the program name (e.g., "NEWS4 AT NITE"), or the reporter's name (e.g. "Carol Jones").

By recognizing the text box, image processor 120 can index video frames and clips based on program name, host name, producer name, director name, or any other name. This includes the identification and classification of images based upon the names of music groups (e.g., MTV and VH-1 video clips), talk show hosts or guests, etc. Furthermore, sports programs can be retrieved by extracting box scores that frequently appear on the the screen. For example, image processor 120 may search for scores, team names, player names, and the like. Stock market information can be extracted and indexed. Weather information can also be extracted and indexed based on the text information present on the screen.

The scrolling "ticker" that runs during games, talk shows, news, and the like can be recognized by examining image text with respect to selected attributes. Screen tickers deliver information about weather condition updates, stock market status, and other information which can be identified and labeled by attribute analysis and retrieved for future use. Extracted ticker information can be viewed as independent from the broadcast program itself since it is unrelated to the program video with which it appears.

The analysis of superimposed text related to the content of the rest of the frame can be helpful when it is required to identify keyframes of a video segment. Such superimposed information is complementary to the visual, audio and transcript (closed captioning or teletext) information. This text can be used in conjunction with shot detection algorithms for video indexing to generate keyframes with text in them. The keyframes with text are more meaningful and representative of the video sequence than ones without text. For example, a keyframe with the score of a football game is more useful than one without a score. Further, the detection of the location and size of text in commercials can be used in conjunction with other attributes for reliable detection of commercials.

Further, video text analysis provides new opportunities for analyzing and categorizing video content of the rest of the image. Scene text and its attributes provides clues about the video content. This provides several advantages, including the fact that it requires much less computer memory and time to analyze text, rather than to analyze the visual content of the video. For example, detection of scrolling text may identify the beginning or the end of a program. Thus, this attribute may be helpful when it is necessary to find program boundaries within a video with a grouping of multiple programs.

FIGS. 3A and 3B illustrate exemplary video frames 305 and 350 containing image text having selected attributes identifiable by video processing device 110 in FIG. 1. The image text in video frames 305 and 350 does not necessarily appear simultaneously on screen during any video clip. Video frames 305 and 350 are presented to illustrate selected attributes of image text, such as scrolling motion, location, fading, brief duration and keywords. For the purposes of brevity and clarity in explaining the operation of the present invention, image text from different types of programs are combined into video frames 305 and 350.

Video frame 305 represents text extracted from a video frame of a television program. In this case, the system/user has selected attributes for isolating horizontally or vertically scrolling text, such as text associated with program credits or ticker lines of information at the bottom of the frame. A scrolling attribute is detected by identifying text that is identical in a sequence of frames, except that the position of the text shifts slightly from frame to frame. Furthermore, even for program credits that are not scrolling, image processor 120 may identify program credits by identifying a sequence of text messages that appear only briefly on the screen and, optionally, by further identifying keywords in the text, such as "producer," "director," "starring," "cast," and the like.

Using selected vertical scrolling attributes, image processor 120 has isolated credit text lines 310, which is an upwardly scrolling text area as indicated by the dotted rectangle. Using selected horizontal scrolling attributes, image processor 120 has isolated at the bottom of the frame scrolling warning text message 315, which is a weather message in the indicated rectangle, with the text scrolling toward the viewer's left.

Video frame 350 contains other examples of image text having particular attributes that may readily be identified in a video frame. For example, box score text 355 in the upper left corner of the video frame 350 provides three lines of text. The first line identifies the station or network and the remaining two lines display a game score. Image processor 120 may identify sports program by identifying in-screen sports scores having attributes similar to box score text 355. Most scores are typically presented in a corner of the screen and numerical data (i.e., each team's point total) appears vertically aligned the box score.

Similarly, advertisement text 360 has the keyword attributes of a phone number associated with an advertiser (e.g., "1-800-") and advertisement text 365 has the keyword attributes of an Internet address associated with an advertiser (e.g., "www.[company name].com"). Furthermore, advertisement text 360 and advertisement text 365 have another text attribute that may be used to identify a commercial advertisement, namely both are located near the center of video image 350. Most other types of text are located at the bottom or in the corner of the screen. Finally, text area 370 has a keyword attribute (namely "news") that identifies the frame as being part of a news program. Text area 375 has another keyword attribute (namely "live") that indicates the displayed text frame is part of a news program.

Figure 4:
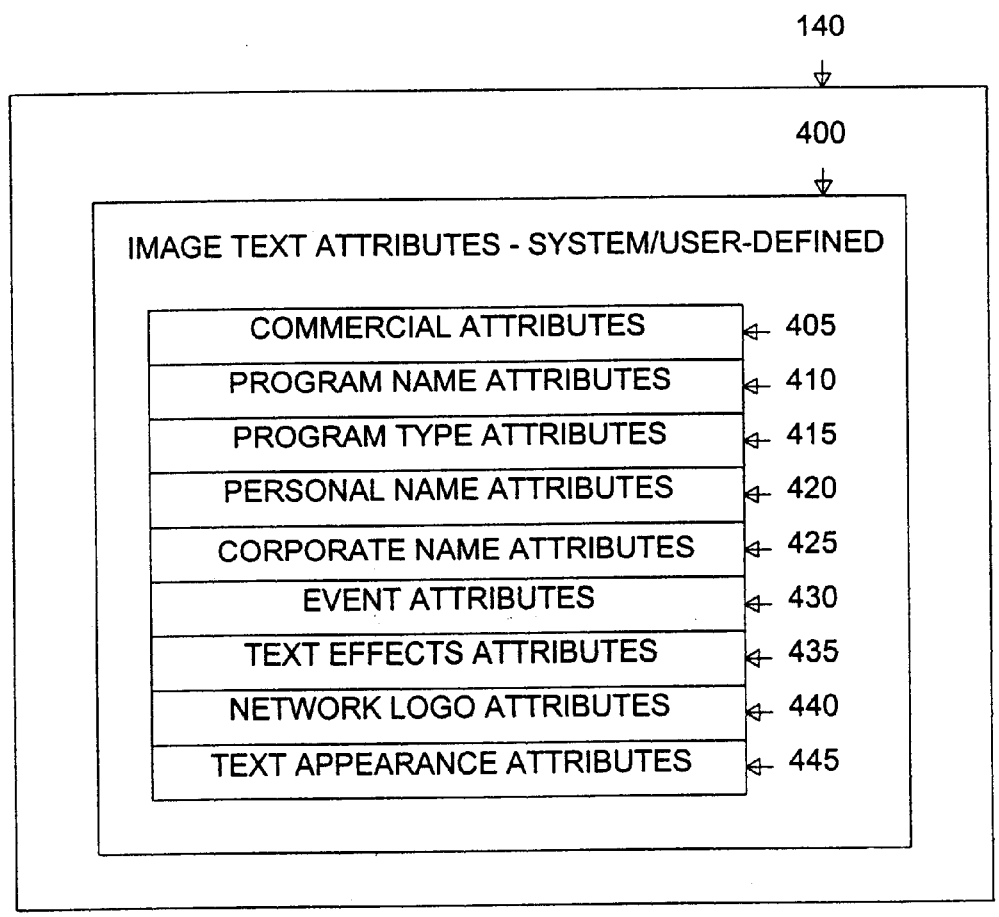
FIG. 4 illustrates an exemplary image text attribute table comprising system-defined and user-defined image text attributes in accordance with one embodiment of the present invention.

FIG. 4 illustrates exemplary image text attribute table 400 in storage 140, which comprises system-defined and user-defined image text attributes in accordance with one embodiment of the present invention. Each system/user-defined attribute classification in table 400 corresponds to a file of attributes which may be fixed or variable, as determined by the particular implementation of the image text analysis system of FIG. 1.

Commercial attributes 405 represent characteristics of commercial advertisement text that may be extracted in a file for viewing. Attributes associated with commercial content may include text within certain size or placement restrictions, text of brief duration, display of phone numbers, mailing addresses, Internet addresses, and keywords within the commercial such as "sale," "manufacturer rebate," or the like.

Program Name attributes 410 provide the system/user with means for isolating a video clip in which text appears that indicates a particular program. Again, Program Name attributes 410 may include attributes such as size and placement, as well as an actual program name, such as "Seinfeld." Program Name attributes 410 may indicate that image processor 120 should only look at an identified segment of the video clip (such as beginning) for the program name, in order to eliminate commercials for the program that appear during different programs.

Program Type attributes 415 include text attributes that identify a particular type of program (sports, news, music video, etc.). These types of programs may be identified as described above by searching for box score attributes, including sports league keywords (e.g., NBA, NHL), news program keywords (e.g., "news," "Weather," "live"), or music video keywords (e.g., "producer," "recorded by").

Personal Name attributes 420 includes text that identifies a specific person ("John Smith") and may be used in conjunction with other text attributes (such as news program name, sports organization name, etc.). Corporate Name Attributes 425 provide means for examining a video clip for the presence of a specific corporate name. For instance, image processor 120 may identify a particular corporate name on a billboard surrounding a baseball field. The attribute selection may include previously described text features, identification of program types to be searched for corporate names, identification of specific corporate name(s) for display, corporate names shown on products within a particular news show, etc.

Event attributes 430 refers to text attributes of particular types of events, such as the Super Bowl or White House briefings. In this regard, Event attributes 430 may be very similar to Program Type attributes or Personal Name attributes.

Text Effects Attributes 435 provides a group of standard text characteristics which are available for selection and display purposes. Text Effects Attributes 435 may include text effects such as horizontal and vertical scrolling, zoom (i.e., zoom in or out), flashing, wave (or ripple), peel, scrambling, flying, animation, and in-scene text.

Network Logo attributes 440 refers to text attributes associated with network identification logos. These include network names and logos for use when matching text and primary frame areas where logos are most likely to be placed. It is a common practice for networks to superimpose a faded outline (or watermark) of their logo over the screen image of the program.

Text Appearance attributes 445 refers to one or more particular features of image text, such as a particular text color, font type, text height, text width, or text position. In the case of text height, text width, or text position, the dimension or position may be given in absolute terms (e.g., a specified number or range of pixels) or in relative terms (e.g., a specified percentage or percentage range of the screen size).

Figure 5:
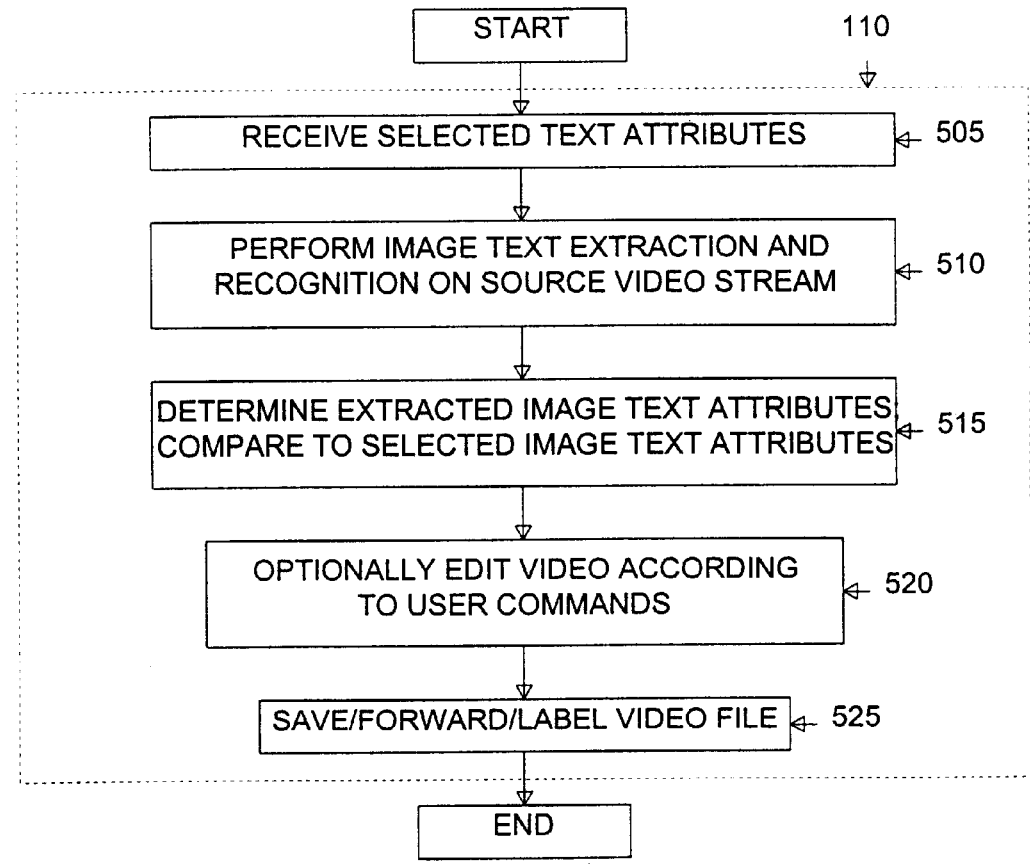
FIG. 5 is a flow diagram illustrating an image text attribute analysis operation of the video processing device in FIG. 1 according to one embodiment of the present invention.

FIG. 5 depicts flow diagram 500, which illustrates an image text attribute analysis operation of exemplary video processing device 110 in accordance with one embodiment of the present invention. A group of standard text attributes may be stored in storage 140 by text analysis controller 134 at time of system initialization and/or modified or entered through user devices 190. Thus, image processor 120 may receive selected text attributes by default from storage 140 or by specific input from user devices 190 (process step 505).

When video text analysis is activated, image processor 120 detects, extracts, and stores text from the selected video frames, as described in greater detail for FIG. 2 (process step 510). The text attributes of the extracted text are determined and stored in image text work space 132. The extracted image text is then compared with the selected attributes and the result is stored in image text work space 132 and/or storage 140, as required (process step 515).

Depending upon the particular application, video image text that matches the selected attributes may be modified through known editing processes in response to user commands (process step 520). The editing may include, for example, the removal of all commercials, alternatively, retaining only the commercials and deleting the program. The resultant video file and associated analyzed text may then be labeled for retrieval purposes, saved in storage 140, and/or forwarded to internal or external storage for later use (process step 525).

Although the present invention has been described in detail, those skilled in the art should understand that they can make various changes, substitutions and alterations herein without departing from the spirit and scope of the invention in its broadest form.

What is claimed is:

1. For use in a system capable of analyzing image text in video frames, a video processing device capable of one of filtering and searching video streams in response to receipt of at least one selected image text attribute, wherein said selected image text attribute is a non-character attribute, said video processing device comprising:

an image processor capable of receiving a first video stream comprising a plurality of video frames, detecting and extracting image text from said plurality of video frames, determining at least one non-character attribute of said extracted image text, comparing said at least one extracted image text non-character attribute and said at least one selected image text attribute, and, in response to a match between said at least one extracted image text non-character attribute and said at least one selected image text attribute, at least one of:

modifying at least a portion of said first video stream;

transferring at least a portion of said first video stream; and labeling at least a portion of said first video stream.

2. The video processing device set forth in claim 1 wherein said at least one extracted image text non-character attribute indicates that said image text in said plurality of video frames is one of scrolling horizontally; scrolling vertically; fading; zooming; rippling; flying; and flashing.

3. The video processing device set forth in claim 1 wherein said at least one extracted image text non-character attribute indicates that said image text in said plurality of video frames is one of a name of a person; a name of a group; a name of a location; and a name of an event.

4. The video processing device set forth in claim 1 wherein said at least one extracted image text non-character attribute indicates that said image text in said plurality of video frames is part of a commercial advertisement.

5. The video processing device set forth in claim 1 wherein said at least one extracted image text non-character attribute indicates that said image text in said plurality of video frames is one of:

in-scene text; and text appearing at one of a start of a program and an end of a program.

6. The video processing device set forth in claim 1 wherein said at least one extracted image text non-character attribute indicates that said image text in said plurality of video frames is part of a program name.

7. The video processing device set forth in claim 1 wherein said at least one extracted image text non-character attribute indicates that said image text in said plurality of video frames is part of a news program.

8. The video processing device set forth in claim 1 wherein said at least one extracted image text non-character attribute indicates that said image text in said plurality of video frames is part of a sports program.

9. An image text analysis system comprising:

a video processing device capable of one of searching and filtering video streams in response to receipt of at least one selected image text attribute, wherein said selected image text attribute is a non-character attribute, said video processing device comprising:

an image processor capable of receiving a first video stream comprising a plurality of video frames, detecting and extracting image text from said plurality of video frames, determining at least one non-character attribute of said extracted image text, comparing said at least one extracted image text non-character attribute and said at least one selected image text attribute, and, in response to a match between said at least one extracted image text non-character attribute.and said at least one selected image text attribute, at least one of:

modifying at least a portion of said first video stream;

transferring at least a portion of said first video stream; and labeling at least a portion of said first video stream;

a display monitor for displaying said at least a portion of said first video stream; and a user input device for receiving user commands.

10. The video processing device set forth in claim 9 wherein said at least one extracted image text non-character attribute indicates that said image text in said plurality of video frames is one of scrolling horizontally; scrolling vertically; fading; zooming; rippling; flying; and flashing.

11. The video processing device set forth in claim 9 wherein said at least one extracted image text non-character attribute indicates that said image text in said plurality of video frames is one of a name of a person; a name of a group; a name of a location; and a name of an event.

12. The video processing device set forth in claim 9 wherein said at least one extracted image text non-character attribute indicates that said image text in said plurality of video frames is part of a commercial advertisement.

13. The video processing device set forth in claim 9 wherein said at least one extracted image text non-character attribute indicates that said image text in said plurality of video frames is one of:

in-scene text; and text appearing at one of a start of a program and an end of a program.

14. The video processing device set forth in claim 9 wherein said at least one extracted image text non-character attribute indicates that said image text in said plurality of video frames is part of a program name.

15. The video processing device set forth in claim 9 wherein said at least one extracted image text non-character attribute indicates that said image text in said plurality of video frames is part of a news program.

16. The video processing device set forth in claim 9 wherein said at least one extracted image text non-character attribute indicates that said image text in said plurality of video frames is part of a sports program.

17. For use in a system capable of analyzing image text in video frames, a method of one of searching and filtering video streams in response to receipt of at least one selected image text attribute, wherein the selected image text attribute is a non-character attribute, the method comprising the steps of:

receiving a first video stream comprising a plurality of video frames;

detecting and extracting image text from the plurality of video frames;

determining at least one non-character attribute of the extracted image text;

comparing the at least one extracted image text non-character attribute and the at least one selected image text attribute; and in response to a match between the at least one extracted image text non-character attribute and the at least one selected image text attribute, at least one of:
modifying at least a portion of the first video stream;
transferring at least a portion of the first video stream; and
labeling at least a portion of the first video stream.

18. The method set forth in claim 17 wherein the at least one extracted image text non-character attribute indicates that the image text in the plurality of video frames is one of scrolling horizontally; scrolling vertically; fading; zooming; rippling; flying; and flashing.

19. The method set forth in claim 17 wherein the at least one extracted image text non-character attribute indicates that the image text in the plurality of video frames is one of a name of a person; a name of a group; a name of a location; and a name of an event.

20. The method set forth in claim 17 wherein the at least one extracted image text non-character attribute indicates that the image text in the plurality of video frames is part of a commercial advertisement.

21. For use in a system capable of analyzing image text in video frames, computer executable process steps stored on a computer readable storage medium for performing one of searching and filtering video streams in response to receipt of at least one selected image text attribute, wherein the selected image text attribute is a non-character attribute, the computer executable process steps comprising the steps of:

receiving a first video stream comprising a plurality of video frames;

detecting and extracting image text from the plurality of video frames;

determining at least one non-character attribute of the extracted image text;

comparing the at least one extracted image text non-character attribute and the at least one selected image text attribute; and in response to a match between the at least one extracted image text non-character attribute and the at least one selected image text attribute, at least one of:
modifying at least a portion of the first video stream;
transferring at least a portion of the first video stream; and
labeling at least a portion of the first video stream.

22. The computer readable storage medium set forth in claim 21 wherein the at least one extracted image text non-character attribute indicates that the image text in the plurality of video frames is one of scrolling horizontally; scrolling vertically; fading; zooming; rippling; flying; and flashing.

23. The computer readable storage medium set forth in claim 21 wherein the at least one extracted image text non-character attribute indicates that the image text in the plurality of video frames is one of a name of a person; a name of a group; a name of a location; and a name of an event.

24. The computer readable storage medium set forth in claim 21 wherein the at least one extracted image text non-character attribute indicates that the image text in the plurality of video frames is part of a commercial advertisement.

* * * * *